US008314357B2

(12) United States Patent
Kuypers

(10) Patent No.: US 8,314,357 B2
(45) Date of Patent: Nov. 20, 2012

(54) JOULE HEATED NANOWIRE BIOSENSORS

(75) Inventor: Frans A. Kuypers, El Cerritos, CA (US)

(73) Assignee: Children's Hospital and Research Center at Oakland, Oakland, CA (US)

( * ) Notice: Subject to any disclaimer, the term of this patent is extended or adjusted under 35 U.S.C. 154(b) by 604 days.

(21) Appl. No.: 12/559,158

(22) Filed: Sep. 14, 2009

(65) Prior Publication Data

US 2010/0282734 A1 Nov. 11, 2010

Related U.S. Application Data

(60) Provisional application No. 61/176,832, filed on May 8, 2009.

(51) Int. Cl.
*B23K 15/00* (2006.01)
*B23K 26/00* (2006.01)

(52) U.S. Cl. ......... 219/121.12; 219/121.14; 219/121.18; 219/121.19; 219/121.2; 219/121.6; 219/121.67; 219/121.68; 219/121.69

(58) Field of Classification Search ............. 219/121.12, 219/121.14, 121.18, 121.19, 121.2, 121.6, 219/121.67, 121.68, 121.69
See application file for complete search history.

(56) References Cited

U.S. PATENT DOCUMENTS

| | | | | |
|---|---|---|---|---|
| 4,915,750 | A * | 4/1990 | Salsgiver et al. | 219/121.12 |
| 5,173,441 | A * | 12/1992 | Yu et al. | 219/121.68 |
| 5,364,493 | A * | 11/1994 | Hunter et al. | 219/121.69 |
| 5,607,607 | A * | 3/1997 | Naiman et al. | 219/121.68 |
| 5,633,123 | A * | 5/1997 | Hill et al. | 219/121.68 |
| 5,633,735 | A * | 5/1997 | Hunter et al. | 219/121.68 |
| 5,645,740 | A * | 7/1997 | Naiman et al. | 219/121.68 |
| 6,515,218 | B1 * | 2/2003 | Shimizu et al. | 219/121.68 |
| 6,670,571 | B2 * | 12/2003 | Dance | 219/121.18 |
| 6,730,370 | B1 * | 5/2004 | Olafsson | 219/121.12 |
| 7,674,389 | B2 * | 3/2010 | Zettl et al. | 219/121.2 |
| 7,993,538 | B2 * | 8/2011 | Golovchenko et al. | 219/121.2 |

* cited by examiner

*Primary Examiner* — Trong Phan

(74) *Attorney, Agent, or Firm* — David R. Stevens; Stevens Law Group

(57) ABSTRACT

A method of using Joule heating to regenerate nanowire based biosensors. The nanowire based biosensor contains various detection molecules, such as nucleic acids, bound to the surface of the nanowire. Binding of analyte nucleic acids to the detection molecules alters the electrical properties of the nanowire, producing a detectable signal. By passing a Joule heating effective amount of electrical current through the nanowire, the nanowire may be heated to a temperature sufficient to dissociate the bound analyte from the detection molecule, without damaging the detection molecules or the bond between the detection molecules and the nanowire surface. The Joule heated nanowires may thus be regenerated to an analyte-free "fresh" state and used for further sensing. In alternate embodiments, the specificity of the nanowire for a particular analyte may be modulated by using Joule heating to heat the nanowire to an intermediate temperature where some analytes bind and some do not.

47 Claims, 9 Drawing Sheets

JOULE HEATED NANOWIRE BIOSENSORS

RELATED APPLICATIONS

This application claims priority based on U.S. Provisional Application No. 61/176,832, filed on May 8, 2009.

BACKGROUND OF THE INVENTION

Biosensors are used for a large number of different research, industrial, and medical applications. Such sensors detect analyte molecules of interest, in particular biological molecules and macromolecules, by a variety of different mechanisms. Some biosensors react enzymatically with analyte molecules, while other biosensors capture analyte molecules using different types of antibody or nucleic acid capture agents.

One thing that all biosensors have in common is that after the biosensor detects an analyte molecule, the biosensor then typically produces a detectable signal, such as a fluorescent, colorimetric, or electronic signal, which in turn can usually be detected by suitable photometric or electrical signal sensing instrumentation.

Biosensors are typically either single use or multiple use. Although a multiple use biosensor is clearly preferable to a single use biosensor, it isn't always technically feasible to reuse a biosensor. Some biosensors, particularly enzymatic biosensors, are inherently single use because the biosensor's enzyme or enzyme substrate component becomes exhausted during the first sensing run. Even for non-enzymatic biosensors, such as antibody or nucleic acid based biosensors, the biosensor may become fouled by the target analyte molecules, preventing the sensor from being reused.

One interesting class of biosensors is based upon field-effect transistors (FET). The conductivity of the FET transistor can be greatly affected by very small changes in the electrical properties of the FET's "gate" terminal component. Thus by binding suitable detection components to the FET gate, a FET based biosensor can be created in which the binding of analyte biological molecules to detection group molecules (which are bound to the FET gate), modulate the conductivity of the FET transistor. Due to the high electrical amplification characteristics of a FET, the binding of a relatively few biological target analyte molecules to the FET gate bound detection group molecules creates a substantial change in the electrical conduction characteristics of the FET. This change can then be detected and reported by suitable electronic instrumentation.

Although a number of different materials can be used to create FETs, silicon is one of the most common materials used for this purpose.

As efforts to increase the sensitivity of FET transistors have progressed, the geometry of the FET transistor has changed. It was found that as the geometry of the FET transistor became smaller and more wire-like, a number of favorable effects occurred. The FET gate, where the biological molecule detecting groups or elements are bound, is typically on the outside of the FET. Binding of such molecules to the gate affects the conductivity of the FET body material on the inside of the FET. As the size of the FET shrinks, the ratio of the gate (surface) to body (volume) grows, and thus molecules bound to the gate exert a greater effect on the electrical conductivity of the FET body material. As the length of the FET grows, there is more opportunity for molecules bound to the gate to alter the conductivity of the FET body. The longer length also provides more room to bind a larger number of detection group or element molecules to the FET gate, increasing the sensitivity of the FET still more.

As a result, recent work in the field has increasingly focused on biosensing FETs and other devices where the geometry of the FET has been shrunk and stretched to create near atomic scale wires with lengths on the order of 4-50 microns (1 μm=1000 nanometers) and widths and heights on the order of 50-100 nanometers. Such devices are called nanowires, or (if silicon is used as the device substrate) silicon nanowires.

Some recent reviews of nanowire biosensors include Patolsky et. al., "Nanowire sensors for medicine and the life sciences", Nanomedicine (2006), 1(1), 51-65; and Li et. al., "Silicon nanowires for sequence-specific DNA sensing: device fabrication and simulation," Appl. Phys A 80, 1257-1263 (2005).

Although, on a theoretical level, silicon nanowires appear to be a promising biosensor approach, there are still a number of issues that must be resolved in order to make such technology practical for routine use.

One of these practical problems is the problem of creating long lifetime, reusable, nanowire biosensors. When the biosensors are freshly made, the detecting element molecules (such as antibodies or nucleic acids) that bound to the surface of the nanowire are initially unoccupied by their target analyte molecules, and thus a fresh biosensor has very high sensitivity. However after the first sensing session, a number of the analyte (target) molecules may remain bound to the detecting elements, rendering these elements inactive. As the number of sensing sessions increases, the number of free (no previously bound analyte) detecting elements decreases, and eventually the biosensor becomes too insensitive to be useful (fouled).

In order to restore nanowire sensitivity, various schemes have been proposed. These schemes include regenerating the nanowire biosensor by flushing it with excess amounts of fresh buffer that free from analyte (target) molecules. Although such methods are likely to be effective at removing very weakly bound target analyte molecules, they are likely to be ineffective at removing more strongly bound target analyte molecules, such as nucleic acid analyte molecules.

Other methods to regenerate nanowire biosensors, such as flushing the biosensor with a binding disruption buffer (typically a low salt buffer, a high salt buffer, a detergent, a chaotropic agent, or other agent) can be cumbersome and problematic for many applications. Thus improved methods to more easily regenerate nanowire biosensors are desirable.

SUMMARY OF THE INVENTION

The binding of analyte molecules to detection elements (groups, molecules) on the surface of the nanowire modulates the conductivity of the nanowire, and this conductivity change can be monitored by passing only very small amounts of electrical current through the nanowire. Thus nanowires are typically monitored using very low levels of electrical current. However when higher amounts of electrical current are passed through nanowires, a different phenomenon occurs. The nanowires heat up due to Joule heating. If the nanowires become too hot, then the detection elements that are bound to the nanowire surface are either damaged, or they completely detach (ablate) from the nanowire, destroying the biosensing capability of the nanowire.

However by passing a precisely controlled amount of Joule heating current through the nanowire, at a carefully controlled level that generates less than the amount of Joule heat needed to damage the detection elements mounted on the nanowire surface, but more than the amount of heat needed to dissociate bound target analyte molecules from the detection elements; then the biosensor can be either regenerated or alternatively tuned to a higher degree of specificity. The nanowire may then once again be used as a biosensor by passing low (detection level) amounts of electrical current through the nanowire, monitoring the electrical signal, and then exposing the nanowire to a new analytical sample containing new target molecules.

Such Joule heated, specificity tuned or regenerated, nanowire biosensors can be employed in a number of useful analytical devices. A number of such analytical devices that employ this method are disclosed.

DETAILED DESCRIPTION OF THE INVENTION

Silicon nanowire biosensors useful for the present invention can be fabricated by various types of nanofabrication processes. In one embodiment, the size of the silicon nanowire may be about 50 to 100 nm wide, about 50 nm thick, and the length may be about 4 to 50 μm long (4,000 to 50,000 nm), however alternate dimensions are quite possible, and these examples are not intended to be limiting.

Likewise, although the term "biosensor" is also frequently used in this specification, this term is also not intended to be limiting. The nanowire techniques disclosed here may work with non-biological analytes as well, such as organic analytes (organic chemicals) produced by a non-biological process.

Examples of methods that may be used to create such silicon nanowire biosensors include the methods taught by Patolsky et. al., "Nanowire sensors for medicine and the life sciences" Nanomedicine, 2006. 1(1): p. 51-65; Patolsky et. al "Nanowire-based biosensors", Analytical Chemistry, 2006. 78(13): p. 4260-4269; Zheng et al., "Multiplexed electrical detection of cancer markers with nanowire sensor arrays" Nature Biotechnology, 2005. 23(10): p. 1294-1301; Park et al., "Towards the silicon nanowire-based sensor for intracellular biochemical detection", Biosensors & Bioelectronics, 2007. 22(9-10): p. 2065-2070; and Park et al., Selective surface functionalization of silicon nanowires via nanoscale Joule heating" Nano Letters, 2007, 7(10), 3106-3111.

Figure 1:
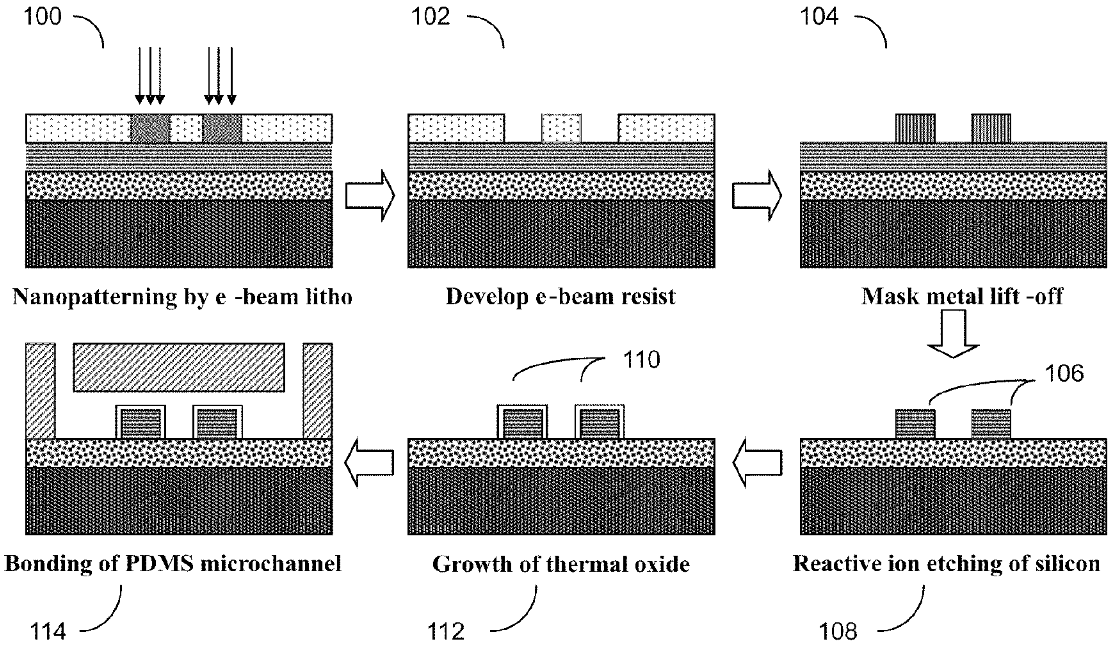
FIG. 1 shows how flow cells containing Joule heating regenerable biosensing nanowires may be constructed.

A brief review of this process is shown in FIG. 1. In this example, silicon nanowires can be fabricated by nanopatterning technology (electron-beam lithography) and directional dry etching technique (reactive ion etching) of a silicon-on-insulator (SOI) substrate. To do this, ultra-fine nanostructures can be created using electron-beam lithography of an electron-beam sensitive resist (eg. Poly(methyl methacrylate) (PMMA) (100). This electron-beam etched resist can then be developed (102), the mask removed (104), and the remaining silicon from this layer, which forms the silicon nanowires (106) can be reactive ion etched (108). A layer of thermal oxide (110) can then be gown on top of the nanowires (112). The silicon nanowire sensor can then be bonded to a microchannel flow cell device (114), which will often be made of polydimethylsiloxane (PDMS).

The biosensing nanowires will typically be packaged as part of a sensing device, such as a flow cell device. Such devices can be formed from a variety of different materials, including glass, gold electrodes, PDMS or other support material.

As one example, the biosensing nanowires can be assembled into PDMS microchannels bonded to Pyrex glass. One way to create this type of microchannel is to use micromolding techniques to create the microchannels on a silicon wafer using 3.0 μm-thick negative photoresist, such as (SU-8 2002). To create electrodes on the glass substrates, Cr and Au layers may be sputtered on the glass wafers at a thickness of 200 Å and 2000 Å, respectively. The geometry may be then patterned, and PDMS microchannels and the glass substrate may be bonded together using various methods, such as by use of a high frequency generator, BD-10AS (Electro-Technic Products, INC).

To form a biosensor, the surface of silicon nanowires can be chemically functionalized and used for the selective detection of biomolecules. If the target analytes are nucleic acids, the nanowires may be functionalized with 3-mercaptopropyltrimethoxysilane and complementary nucleic acid or peptide nucleic acid (PNA) molecules (here used as a nucleic acid detection element), forming a covalent link between the nucleic acid detection element and the silicon surface of the nanowire.

The use of PNA as detection element for DNA (Deoxyribonucleic acid) or RNA (Ribonucleic acid) target analyte molecules has a number of advantages, because PNA contains no charged phosphate groups, and therefore generates a stronger bond with target DNA or RNA. Whenever this disclosure teaches detection of DNA or RNA target molecules, it should be assumed that the detection elements for these DNA or RNA target molecules include PNA detection elements, as well as DNA or RNA based detection elements. Detection elements can be molecules selected from the group consisting of proteins, nucleic acids, nucleic acid binding molecules, protein binding molecules, DNA, RNA, PNA, carbohydrates, lipids, and saccharides.

Alternatively, the nanowires may be modified with 3-aminopropyltriethoxysialne (APTES), and NHS(N-hydroxysulfosuccinimide)-sulfo-biotin. If this is used, the detection elements, which may be biotin or avidin labeled antibodies or nucleic acids, may be immobilized to the silicon nanowire surface using a very strong non-covalent biotin link, such as a biotin-avidin or biotin-strepavidin link.

Usually, the detection elements (also called detection groups or detection molecules) are bound to the nanowire surface by a strong bond such as a covalent bond or link. One exception to this general rule are biotin—biotin binding protein bonds (links), such as the avidin-biotin and strepavidin-biotin link. These links or bonds are unusual in that they are one of the few cases where a non-covalent bond formed between two molecules has approximately the same binding strength as a covalent bond. The avidin-biotin bond is both strong and very heat resistant. In fact, as reported by Wei and Wright "Heat stability of Avidin and Avidin-Biotin Complex and Influence of ionic strength on affinity of Avidin for Biotin", Proc. Soc. Exp. Biol. Med. 1965 November; 117: 341-344; the avidin-biotin link is resistant to heat dissociation at temperatures in excess of 100° C.

Joule Heating:

Joule heating is expressed by the equation:

$$Q=I^2Rt$$

where Q is the amount of heat (in Joules), I is the amount of electrical current (in amps) passing over the nanowire, R is the resistance (in ohms) of the nanowire, and t is the amount of time (in seconds) that the current is flowing. As can be seen from the above equation, when higher amounts of current are passed through silicon nanowires for longer periods of time, due to the $I^2$ component of the Joule heating equation, and the longer amount of time, a considerable amount of heat may be generated. In this discussion, when the term "Joule heating" is being used, the intent is to indicate that the temperature of the nanowire biosensor is being raised above the ambient temperature of the nanowire biosensor, where "ambient temperature" means the temperature of the biosensor right before Joule heating was applied. Note also that due to their small size, nanowires typically heat up extremely fast, on the order of nanoseconds or microseconds.

As previously discussed, for biosensing applications, the state of the nanowires is typically probed using very small amounts of electrical current. The resulting joule heating, which is proportional to the electrical resistance of the nanowire and the square of the current flowing through the nanowire, is thus negligible. Using normal sensing levels of current, a nanowire will typically experience less than about 1° C. of Joule heating during the biosensor measurement, and even in extreme conditions, the Joule heating will be under 10° C.

Although nanowires have been subjected to Joule heating before, the use was in a completely different context, and for a different application. For example, Park, et. al. in "Selective Surface Functionalization of Silicon Nanowires via Nanoscale Joule Heating" Nano Letters, 2007, 7(10), 3106-3111, demonstrated that organic molecules bound to the surface of silicon nanowires could be successfully ablated (removed) from nanowire surfaces by applying an electrical bias of approximately 2.5 volts/μm to single crystalline p-type silicon nanowires. These nanowires had a height and width of 100 nm, a 200 nm pitch, a length of about 4000 nanometers, a doping density of $5\times10^{18}/cm^3$, and were fabricated on top of a 400 nm thick silicon dioxide film on a p-type Silicon wafer. Under these conditions, the nanowires reached a temperature of 326° C. When a bias of 3 volts/μm was applied, these wires reached a temperature of about 539° C.

Park taught that heating such nanowires to extremely high temperatures, such as temperatures over 539° C., caused thin (30 nm) nanowire coatings of polymers, such as polytetrafluoroethylene (PFTE), to completely dissociate or ablate from nanowires. This exposed the bare silicon surface of the nanowire, previously covered by the PFTE coating, and allowed Park to surface-functionalize the exposed nanowire silicon in various subsequent manufacturing processes.

However in order to regenerate a nanowire biosensor for subsequent reuse, or precisely tune the detection specificity of the nanowire biosensor, the analyte molecules (for example, proteins or nucleic acids) that bound to the nanowire's detection elements (such as antibodies or complementary nucleic acids attached to the nanowire's surface) must be gently detached from the nanowire in a way that does not destroy the detection elements.

For this purpose, the high levels of voltage and uncontrolled amounts of current taught by Park, which generated extremely high temperatures (greater than 100° C. over ambient temperature) are totally unsuitable. Park's high voltage and uncontrolled current methods, which cause the nanowire to heat up to extremely high but relatively imprecise temperatures, were designed to cause organic molecules (such as PFTE) to completely detach from the nanowire surface. If these methods were applied to a fully formed biosensor with attached organic detection elements, such as nucleic acids or antibodies, these methods would either destroy these attached detection elements or else cause them to dissociate from the nanowire surface, resulting in an inactive biosensor.

On the other hand, the low levels of current previously used to detect changes in nanowire conductivity induced by analyte molecule binding are also unsuited for regenerating nanowires, because not enough heat is generated. In order to regenerate nanowires using Joule heating, an intermediate level of precisely controlled heat is required in order to just dissociate the detection-element-bound analyte molecules, but not dissociate or destroy the nanowire-bound detection element molecules.

Temperatures Required for Dissociation:

Typically an analyte molecule (such as an antigen, protein, or nucleic acid) will bind to it's complementary detection element (such as an antibody or complementary nucleic acid) by non-covalent bonds, such as hydrogen bonds, ionic interactions, Van der Waals interactions, or hydrophobic bonds. By contrast, as previously discussed, a biosensor detection element will typically be bonded to the surface of a nanowire by either a covalent bond, or a temperature resistant covalent strength bond, such as an avidin-biotin bond.

Noncovalent bonds are typically much weaker than covalent bonds. For example, it typically requires 20 times more force to disrupt a covalent bond than it does to disrupt a hydrogen bond. As heat energy is applied to molecules, they move with greater speed and force, and thus as temperature (thermal energy) increases, more and more bonds become disrupted.

The thermal energy required to disrupt non-covalent bonds is typically substantially less than the energy required to disrupt covalent bonds, and the present invention utilizes this difference in dissociation energy to regenerate biosensors. The basic concept is to heat the nanowire biosensor to an intermediate temperature that provides enough thermal energy to dissociate (or dissociate at least some of) the non-covalently bonded analyte molecules from the biosensor surface, but does not provide enough thermal energy to dissociate the covalently bonded detection elements from the nanowire surface.

As an example, proteins typically employ a number of different non-covalent bonds to fold themselves into their native confirmation. When exposed to higher levels of heat, the non-covalent bonds start to break, and when enough non-covalent bonds break, the protein assumes an altered and unnatural conformation and is said to be denatured. For example, Bennett, "Studies on Antigen Conformation during Antibody Purification", Journal of Biological Chemistry 238 (4), 1362-1366 (1962) showed that in an acetic acid buffer, the analyte RNAse noncovalently binds to an anti-RNAse antibody (the detection element) at 25° C., however at 46° C., the binding between the antibody and the RNAse antigen was broken. Thus in this example, raising the temperature from 25° C. to 46° C. was sufficient to break the non-covalent bond between the analyte and the antibody detector molecule.

The binding of analyte nucleic acids to their complementary detection element nucleic acids is also very temperature dependent. For example, Schumakovitch et. al, “Temperature Dependence of Unbinding Forces between Complementary DNA Strands”, Biophys. J, January 2002, p. 517-521, Vol. 82, No. 1; monitored the melting (dissociation) curve of the 16-base DNA sequence 5'-TATTAATATCAAGTTG, in a NaCl buffer, and found that the two strands (here one strand can be considered to be the analyte strand, while the complementary strand can be considered to be the detection element strand) and found that while the two strands formed a stable association below 36° C., at 55° C., the two strands dissociated quite rapidly.

By contrast, the temperatures needed to break covalent bonds are almost always considerably above 100° C. For example, the title of the infamous novel “Fahrenheit 451”, accurately refers to the temperature at which paper burns (i.e. the paper carbon-carbon and carbon-hydrogen covalent bonds are being broken at a high rate), which is 233° C. on the centigrade scale. At temperatures much above 100° C., the covalent bonds that hold the detection element molecules together, and which attach the detection element molecules to the nanowire biosensor surface, become damaged at a high rate, rendering the biosensor useless.

The temperatures needed to break the avidin-biotin covalent-strength bonds, which can alternatively be used to bind detection element molecules to biosensors, are also quite high, typically in excess of 100° C. In contrast to the mere nanoseconds or microseconds needed to heat up and the nanowire and dissociate the bound analyte molecules from the nanowire’s detection elements, the avidin-biotin bond (which can be used to bind the detection elements to the nanowire) can last for 15 minutes or more at 100° C. Thus for these applications, the long-life and heat-stable avidin-biotin linkage functions adequately to bind the detection elements to the nanowire.

Figure 2:
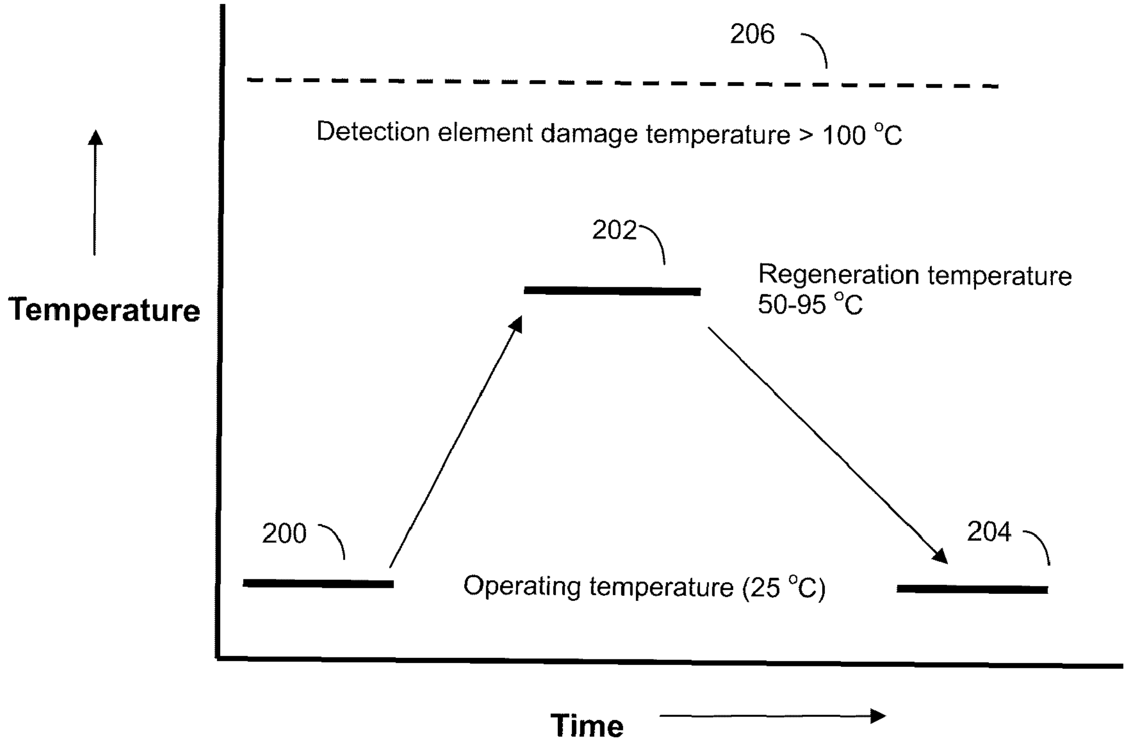
FIG. 2 shows variations in nanowire Joule heating during a biosensor regeneration cycle.

Thus in order to successfully regenerate and reuse a biosensor, the temperature of the biosensor must be modulated by Joule heating within relatively narrow limits. A diagram of these limits is shown in FIG. 2. Here the nanowire biosensor, which will normally be operated in a flow-cell like device, usually at a temperature between about 0 and 37° C. (often 4° C., but here a room temperature of 25° C. will be used as an example), is first run at room temperature (200) while the device is detecting a first analyte. The analyte molecules will run through the flow cell, and bind to the detection elements mounted on nanowires attached to the flow cell surface (see FIG. 3 for further detail). This will be done at a first 25° C. operating temperature.

After the analyte molecules bind, and the detectable signal generated by this binding has been measured by an analytical current across the nanowire, the biosensing nanowire enters a regeneration step. In this regeneration step, a Joule heating amount of current is passed through the nanowire at current level sufficient to cause the nanowire to heat up to a temperature (202), typically in the 50.degree. C. to 95.degree. C. ranges, that is significantly above the normal operating temperature of the nanowire sensing device. However this regeneration Joule heating is still significantly below the temperature (206) which can either damage the detection elements on the nanowire biosensor surface, or break the bond between the detection elements and the nanowire biosensor surface. In some embodiments, the Joule heating amount of electrical current is set at the voltage, current, and time parameters which provide at least 10° C. of joule heating of the nanowire sensor, but less than 100° C. joule heating of the nanowire sensor.

During regeneration temperature step (202), the flow cell will often continue to operate, and analyte-free fluid will often continue to flow past the biosensing nanowires. Thus analyte molecules detached from the biosensor nanowire surface will often be removed from the nanowire region of the flow cell by the action of this fluid flow. Alternatively, the temperature unbound analyte molecules may drift away from the nanowire surface by a process of passive diffusion. As another alternative, the unbound analyte molecules may be induced to migrate away from the nanowire surface by the application of a voltage gradient across the flow cell.

After a suitable period of time at the regeneration temperature (202), the Joule heating current across the nanowire will be reduced, allowing the biosensing nanowire to return to an operating temperature (204) where once again analyte molecules can bind to the detection element molecules. The biosensing nanowire has now been regenerated, and may be used again to detect the next analyte molecules that are introduced into the flow cell.

In order to achieve this precise level of temperature control, specialized electronic circuitry will often be required. Joule heating is a function of the resistance of the nanowire times the square of the current flowing over the nanowire. The resistance of the biosensing nanowire will vary according to how many analyte molecules are bound to the detection molecules on the surface of the nanowire. Thus the amount of current required to heat an analyte covered nanowire to a precise temperature, such as 50° C., may be different than the amount of current required to heat an analyte-free nanowire to 50° C.

In order to achieve this precise control, alternative electrical current control schemes may also be employed. In one scheme, the temperature versus current and resistance characteristics of the nanowire may be previously calibrated. Using this method, the present resistance of the nanowire, which varies with the amount of bound analyte molecules, is first measured by an analytical level of electrical current. Based on this measurement, a precisely measured Joule heating amount of electrical current, which may be either direct current (DC) or alternating current (AC), that is appropriate to the measured resistance of the nanowire, the ambient temperature of the flow-cell fluid, and the desired temperature objective, is applied. This precisely measured amount of Joule heating electrical current can either be applied as a continuous current, or as a precisely timed series of electrical current pulses.

Other heating control schemes are also possible. As an example, although the analyte dissociation from the nanowire is highly temperature dependent, the important variable for this invention is not really the nanowire temperature per se, but rather the amount of analyte-nanowire binding that remains as the Joule heating electrical current flowing through the nanowire is gradually increased. This can be tracked by appropriate electrical control circuitry.

As one example, the electrical control circuitry can be microprocessor controlled, with storage memory, an ability to control the analytical level of electrical current going to the nanowire, circuits to determine nanowire resistance, and circuits to precisely control the timing and amount of Joule heating going to the nanowire. Using this circuitry, the resistance of the nanowire before analyze binding can be monitored by first sending an analytical level of electrical current through the nanowire and saving this initial resistance value R(before) in memory. After analytes have bound to the nanowire, the electrical control circuitry can repeat this resistance measurement with another analytical level of electrical current, and determine the after analyte binding resistance measurement R(after), and save this R(after) value in memory. Next the control circuitry can gradually ramp up the amount of Joule heating current going to the nanowire. This can be done, for example, as a series of short pulses of Joule heating current, where each successive Joule heating current pulse has a higher amount of Joule heating current than the previous pulse.

Due to the small size of the nanowire, the nanowire will cool down extremely rapidly between pulses, and here the time between pulses can be set to be long enough (microseconds or milliseconds) to allow the nanowire to cool down again.

In between the Joule heating current pulses, the resistance of the nanowire can be monitored by analytical levels of electrical current. When the resistance of the nanowire, as determined by the analytical level of analytical current, is roughly (within an acceptable margin of error) equivalent to the R(before) level, than the control circuitry can determine that the bound analyte is no longer binding to the nanowire. This information can be used by the circuitry to determine that the nanowire finally reached the proper regeneration temperature on the last pulse, and terminate the Joule heating process. If the Joule heating current was ramped up gradually, then the nanowire will not reach a temperature high enough to damage the attached detection elements.

Figure 3:
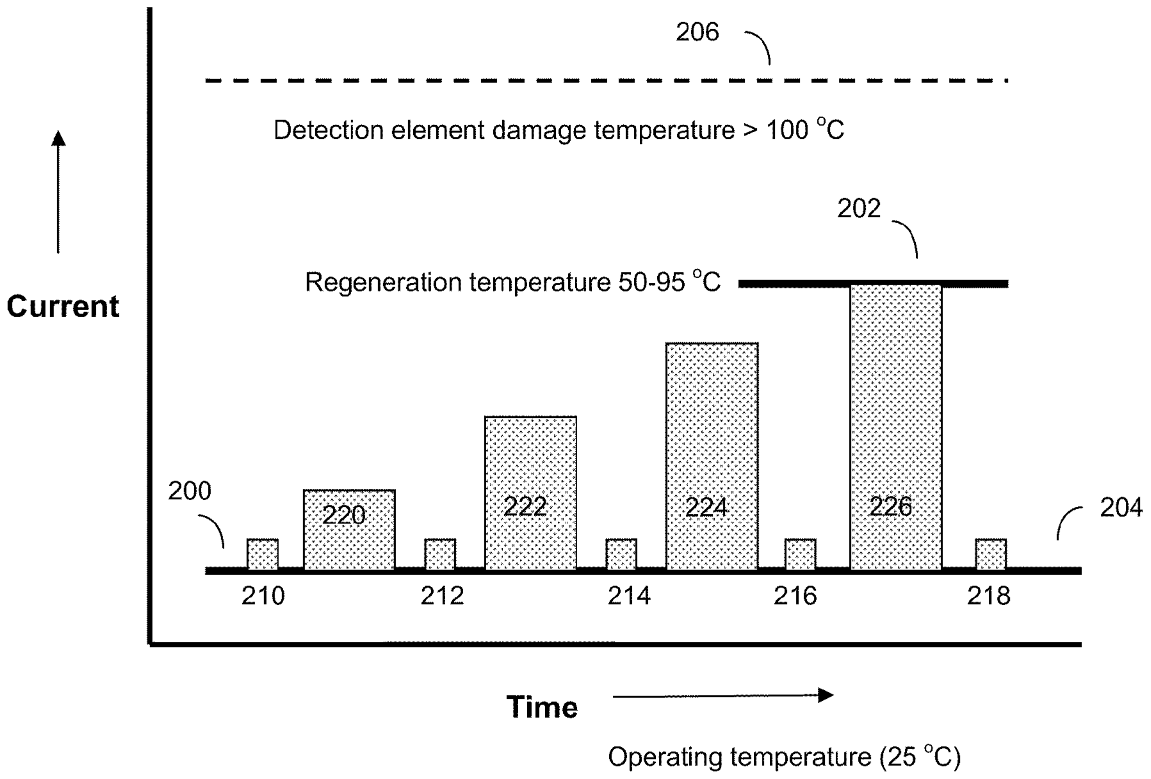
FIG. 3 shows how a series of gradually increasing Joule heating current pulses can be used to regenerate a nanowire biosensor.

An example of this alternate control scheme is shown in FIG. 3. This figure is similar to FIG. 2, except that the "Y" axis now shows the amount of electrical current passing through the nanowire. In this figure, it is assumed that the control circuitry had previously obtained and stored the R(before) value, and that the analyte has already bound to the nanowire. Otherwise, the other values and parameters are as previously discussed in FIG. 2.

In FIG. 3, the electrical control circuitry takes an initial R(after) nanowire resistance measurement using an analytical level electrical current (210), determines how much analyte has bound by comparing this value with the previous R(before) resistance, and then commences a nanowire regeneration process. In this process, the electrical control circuitry passes a series of increasing Joule heating electrical current pulses through the nanowire (220, 222, 224, 226). After each Joule heating pulse, the electrical control circuitry allows the nanowire time to cool off, and then the circuitry takes another R(after) nanowire resistance measurement (212, 214, 216, 218) after each Joule heating pulse. In this example, we see that Joule heating pulse (226) finally delivered enough Joule heating current to raise the temperature of the nanowire to the regeneration temperature range of 50-95° C. (202). As a result, after pulse (226), the analyte dissociated from the nanowire, and the next analytical current resistance measurement (218) returned an R(after) value that was within an acceptable margin of error to the initial R(before) value. At this point, the control circuitry can determine that the nanowire regeneration process is complete. Note that with this scheme, an actual temperature measurement need never be done, and the nanowire is heated up to essentially the minimum temperature needed to dissociate the bound analyte, which typically will be below the temperature level that damages the attached detection elements.

The above example shows the simplest type on-off electrical control, in which the Joule heating is turned on and off, and the resistance is monitored by a separate analytical current after the nanowire has cooled down between each heating pulse. More complex proportional control methods or proportional-integral-derivative control methods may also be used, in which the resistance of the nanowire is determined while the Joule heating current is being applied, and the level of the Joule heating current is then dynamically varied depending upon this resistance measurement.

Due to the relative simplicity of the above electrical feedback methods, such methods will frequently be used for this invention. Thus although it will often be convenient in this specification to speak in terms of temperatures, because the temperature discussion helps make the underlying physical chemistry of the various reactions more apparent, it should be understood that in many embodiments, temperature itself may not be either directly measured or controlled.

In an alternative electrical current control scheme, the actual temperature of the nanowire is measured while the Joule heating current is applied, and the amount of current is modulated to achieve the desired final temperature based on feedback from the measured temperature of the nanowire.

The nanowire temperature may be measured by various methods. One method is to fabricate thermistor or temperature monitoring elements into the same or nearby substrate used to fabricate the nanowire, and use these nearby temperature sensors to monitor the nanowire. Alternatively the temperature of the nanowire may be monitored by its infrared emission characteristics. In another embodiment, temperature sensitive dyes, in particular temperature sensitive fluorescent or luminescent dyes, may be placed on or near the nanowire, optical signals from the dyes monitored, and feedback from these temperature sensitive dyes used to adjust the nanowire to a precise temperature.

Figure 4:
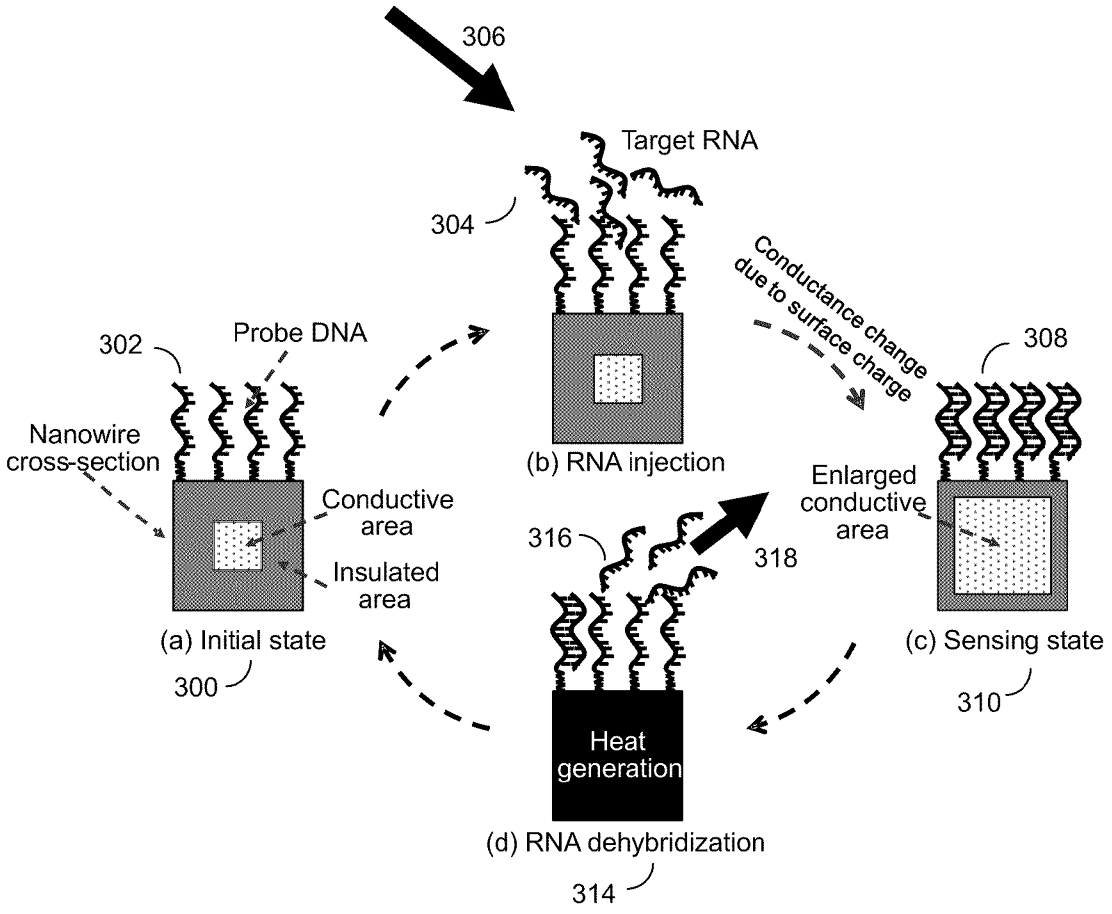
FIG. 4 shows test analyte molecules binding and detaching from detector element or group molecules that are bound to a nanowire surface during a Joule heating biosensor regeneration cycle.

FIG. 4 shows the interactions between the analyte molecules, the detection element molecules, and the nanowire during the course of the regeneration temperature cycle previously shown in FIG. 2.

In this figure, a nanowire (300) has detection element molecules (in this example, probe DNA) (302) bound to the nanowire surface, forming a nanowire biosensor. Because no analyte molecules are bound to the detection elements, the electrical properties of the FET gate material that surrounds the conductive inner body of the nanowire (which is typically a FET or FET like device) render the conductive inner area of the nanowire FET comparatively small, and the resistance of the nanowire is relatively high. During this portion of the cycle, which corresponds to FIG. 2 (200), only an analytical amount of electrical current is flowing through the nanowire, and the nanowire is operating at a low operating temperature.

At this point, analyte molecules (304) (in this example, target RNA) are introduced (306) into the flow cell (FIG. 1 (114)). These analyte molecules bind to the detection elements (probe DNA) forming a complex (308). This complex induces an electrical change to the bulk material in the center of the nanowire (310). More specifically, the electrical properties of the complex (308) cause a change in the electrical properties of the gate material surrounding the nanowire (310). This in turn causes the base material in the center of the nanowire to become more conductive, and the resistance of nanowire (310) drops. This can be detected by passing an analytical (non-Joule heating) level of current across nanowire (310).

After analyte molecules (304) and complex (308) have been detected, the biosensing nanowire can then be regenerated for the next group of analytes. To do this, a Joule heating amount of electrical current is passed over nanowire (314) at a current level sufficient to raise the temperature of the nanowire to the elevated regeneration level (approximately 50 to 95° C.) previously shown in FIG. 2 (202). At this elevated temperature, the bound analyte molecules (target RNA in this example) (316) dissociate from the detection element molecules (probe DNA in this example) and either diffuse away from the nanowire or are removed from the nanowire by the flow of fluid (318) (typically an aqueous buffer) in the flow cell, or by other means.

After the formerly-bound analyte molecules are removed, the Joule heating current passing through nanowire (314) is reduced, and the nanowire returns to its lower operating temperature (usually between 2 and 30° C.) again. This corresponds to FIG. 2(204).

Figure 5:
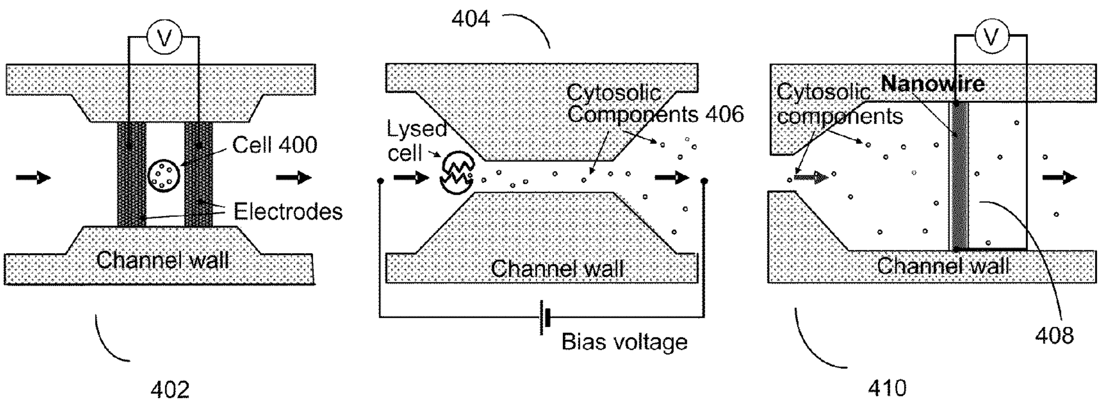
FIG. 5 shows an application of Joule heating regenerable biosensor nanowires in a flow lysometer.

FIG. 5 shows one example of the recyclable nanowire biosensor in use as a detection component of a flow lysometer. Flow lysometers were previously described in copending application Ser. No. 11/934,718, filed Nov. 2, 2007, the contents of which are incorporated herein by reference. Briefly, a flow lysometer is a microfluidic analyzer designed to rapidly analyze a population of cells by running them on a one-at-a-time basis through small fluid-filled capillary channels. The flow lysometer first analyzes the cell's morphology or surface markers, then lyses the cells, and analyzes the molecules present in the cell's interior cytoplasm or nuclear material. The device allows the cell morphology and cell surface molecules to be correlated with the molecules present in the same cell's cytoplasm or nucleic acids. Flow lysometers are most useful when used to analyze a cell population on a one-cell-at-a-time basis. Thus a reusable biosensor, such as a reusable biosensing nanowire, is particularly useful for this type of device.

In FIG. 5, a cell (400) containing internal (cytoplasmic or nuclear) target molecules (such as DNA, RNA or proteins) is immersed in an isotonic carrier buffer and flowed through a microcapillary flow cell. At the front of the flow cell (402) are sensing mechanisms, such as cell passage sensitive electrodes, that sense the passage of the cell. The motion of the buffer, a voltage gradient imparted by a voltage bias, or other force next carries the cell into a cell lysing portion (404). There the cell is lysed (by chemical, electrical, laser or other means), and the cellular components (cytosolic components) (406) spill out into the carrier buffer.

These cellular components can be analyzed by a reusable nanowire biosensor (408) in the next portion of the flow lysometer (410). In order to analyze the next cell from the cell population, after the cellular components (406) from each different cell (400) are analyzed by the nanowire biosensor (408), the nanowire biosensor is regenerated to analyze the next cell by the heating and cooling regeneration process previously described in FIGS. 2-4.

In certain analytical situations, the target analyte of interest may be a member of a family of related analytes. As an example, a particular analyte message RNA (mRNA) sequence of interest (say the mRNA for a particular protein) may be a member of a group of related mRNAs (for example the total mRNA in a cell, or alternatively the mRNAs for related versions (isozymes) of this particular protein) that are expressed in a cell. The mRNA in turn is only a fraction of the total RNA in the cell. The bulk of the overall sample will usually consist of a high level of non-analyte "junk" molecules that are not of interest to that particular analysis.

These non-analyte "junk" molecules that are not of current interest can cause a large background signal, making it difficult to accurately measure the target analyte, and/or the family of related analytes. For example, the relative amounts of the target message RNA sequence, relative to the group of related message RNA's, may be the topic of interest; however the large background of non-related RNAs could potentially obscure both signals. In this type of situation, in order to tease out a small signal of interest from the large background signal, an intermediate purification step may be useful. Here Joule nanowire heating methods can be used to improve the specificity of the biosensor, as well as remove contaminating "junk" molecules.

In a second embodiment of the invention, a first set of detection elements affixed to the surface of a first set of biosensing nanowires, which in turn are usually mounted in a flow cell, can be used to capture and purify a first set of analytes from a test sample. This capture step separates these analytes from the large amount of non-analyte "junk" molecules that will usually be present in a test sample. After the non-analyte molecules have been flushed away by the flow of clean buffer in the flow cell, the first set of nanowires may be given an amount of Joule heating effective to dissociate the first set of now partially purified analytes.

The first set of dissociated and partially purified analytes are carried by the movement of the flow cell buffer to a second set of nanowire biosensors, located downstream from the first set of nanowire biosensors. This second set of nanowire biosensors may have detection elements which may be designed to analyze a subset of the partially purified analytes that were bound by the detection elements attached to the first set of biosensing nanowires.

As an example, message RNA (mRNA) has a header composed of a sequence of repeated adenine residues (poly A), and mRNA can be distinguished from other RNA's, such as tRNA, ribosomal RNA, etc., by this poly A header.

In this example, assume that the flow lysometer is analyzing reticulocytes (immature red cells), and that the objective of the experiment is to determine what percentage of the total mRNA in the reticulocyte is hemoglobin mRNA.

To accomplish this objective, the first set of biosensing nanowires can be designed to monitor the amount of total "poly A" message RNA present in a sample, and the second set of biosensing nanowires can be designed to monitor what percentage of this total "poly A" mRNA encodes for hemoglobin.

To do this, the first set of biosensing nanowires would have detection elements (molecules) composed of a "poly T" nucleic acid sequence that binds to the poly A sequence that is common to all mRNA, and the second set of biosensing nanowires would have detection elements (molecules) composed of nucleic acids with a sequence that is complementary (binds to) the hemoglobin coding region of mRNA.

Although the first nanowire contains a poly A group designed to bind to all mRNA, this nanowire will not bind mRNA with 100% efficiency. Rather, most of the mRNA will still flow past the first nanowire without binding. This excess mRNA can nonspecifically bind to the second hemoglobin mRNA nanowire biosensor, and throw off the results. To prevent this from happening, the second set of hemoglobin mRNA nanowire biosensors can be subjected to Joule heating to prevent any nonspecific binding of this excess poly A mRNA from occurring. When this is done, the second set of hemoglobin sensing nanowires is subjected to Joule heating is "clean" and the excess mRNA and "junk" molecules flow past the second set of hemoglobin nanowires without binding.

After the excess mRNA and the "junk" molecules have been flushed out of the flow cell detector by buffer, the Joule heating of the second set of hemoglobin nanowires can be turned off. This allows these hemoglobin detecting nanowires to cool down, and be able to bind analytes. However at this point in the cycle, only clean buffer is now flowing past this set of nanowires.

In the next step, the first set of total mRNA (poly A) binding biosensing nanowires is subjected to Joule heating. This Joule heating step regenerates the first set of biosensing nanowires, and also dislodges the attached and now purified total mRNA analyte molecules. These purified total mRNA analyte molecules are then carried downstream by the motion of the flow-cell buffer (fluid) to the second set of hemoglobin mRNA biosensing nanowires. This second set of hemoglobin mRNA biosensing nanowires can then detect the subset of target analyte molecules of interest (hemoglobin mRNA) from the partially purified batch of total mRNA analyte molecules that were partially purified (separated from non mRNA molecules) by binding to the first set of mRNA biosensor nanowires.

This accomplishes two objectives: 1) determining the relative ratio of the target analyte molecules of interest (hemoglobin mRNA) relative to the purified analyte molecules (total mRNA); 2) improving the signal to noise ratio of the system (improved sensitivity) by first purifying the analyte molecules of interest (hemoglobin mRNA) away from the large background of "junk" molecules (non-mRNA nucleic acids, etc.) in the sample.

Figure 6:
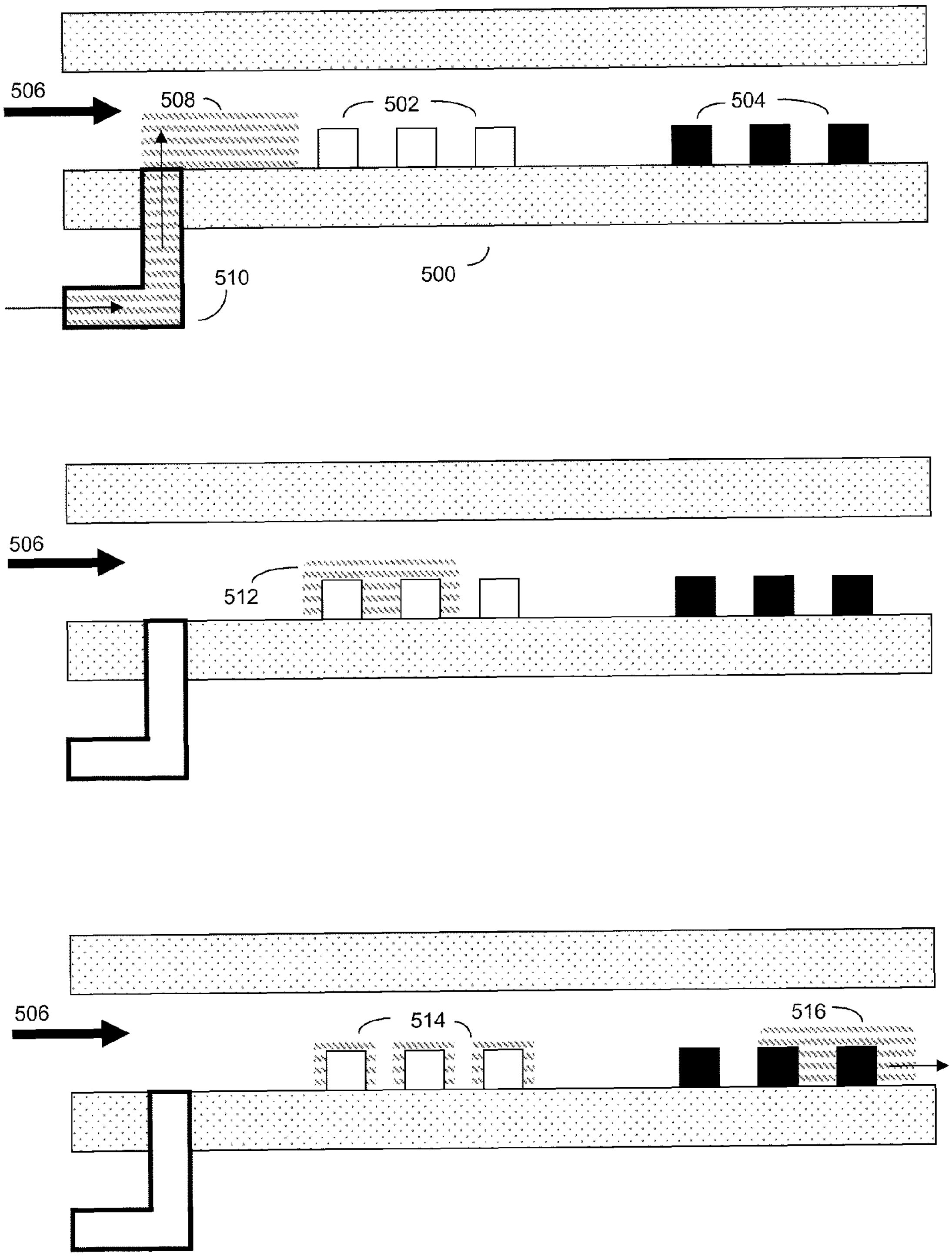
FIG. 6 shows how multiple Joule heating regenerable nanowire biosensors may be used to either purify analytes from a test sample, or report on the ratio between different analyte molecules in a test sample.
Figure 7:
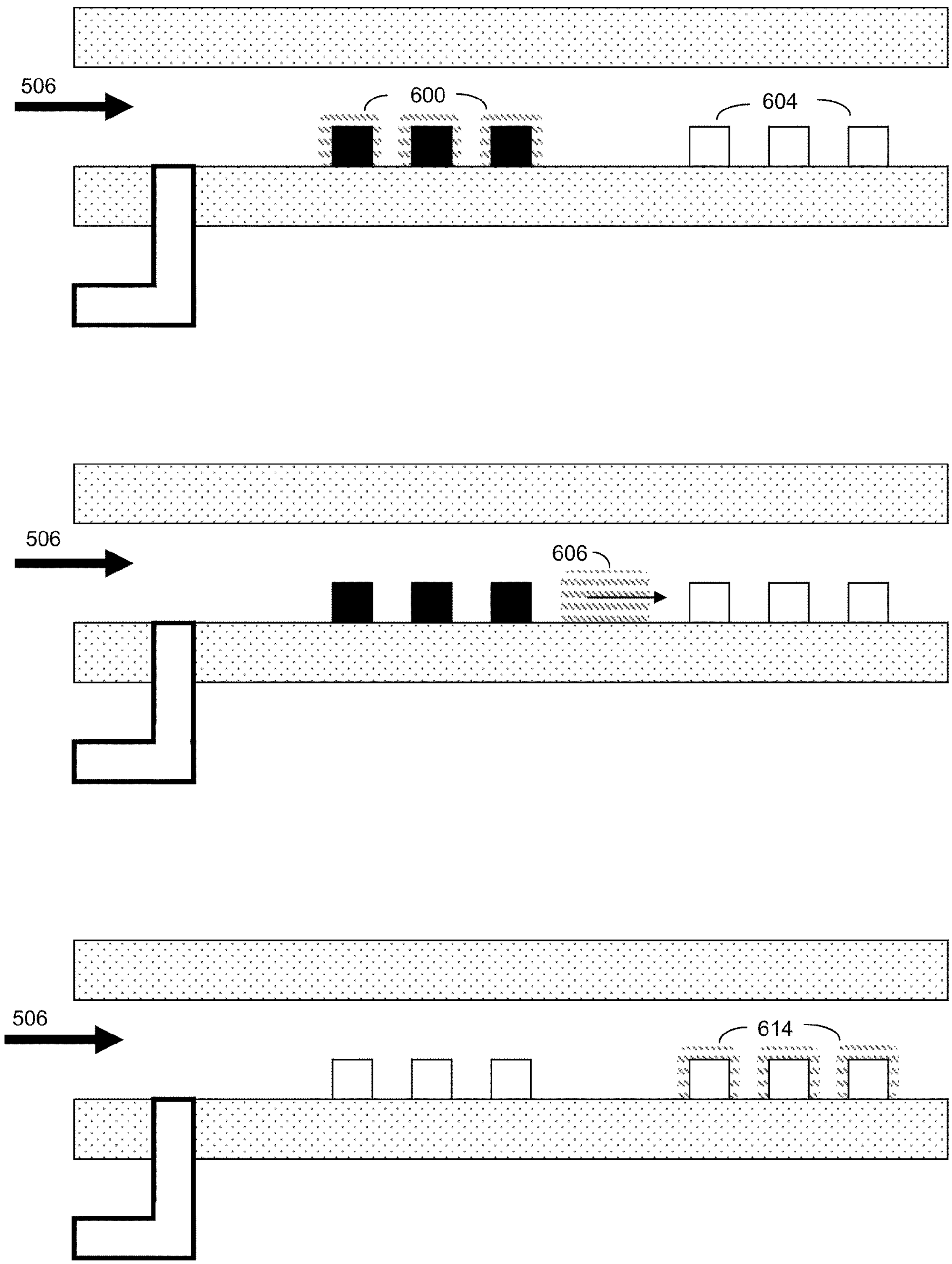
FIG. 7 shows additional details of the flow cell device previously shown in FIG. 5.

FIGS. 6 and 7 show how this two step process works. Again, for simplicity, the same examples of total mRNA and hemoglobin mRNA detection will be used, but it should be clear that these particular molecules are examples only, and these methods will in fact work with a wide variety of different nucleic acids, proteins, antigens, and other analytes of interest.

FIG. 6 shows a flow cell analytical device (500) equipped with two groups of biosensing nanowires. The first group of biosensing nanowires (502), designed to analyze the total amount of mRNA in a sample, has detection element molecules composed of short poly-T nucleic acids, designed to bind to the poly A groups on all mRNA. The second group of biosensing nanowires (504) has detection element molecules composed of short nucleic acid strands complementary to hemoglobin mRNA. Because the first group of biosensing nanowires is being used to purify a substantial amount of analyte, often there will be a relatively large number of such first group nanowires in order to provide enough surface area to efficiently capture analyte molecules.

An aqueous fluid buffer (506) is injected into the flow cell at one port, and a reticulocyte cell extract containing a crude mix of mRNA and other cytoplasmic molecules (508) is injected into the flow cell at a second port (510). During this process, the second group of hemoglobin biosensing nanowires (504) is given an electrical current sufficient to produce enough Joule heating to raise the temperature of the nanowires sufficiently high (typically 50 to 95° C.) to prevent nucleic acids present in the crude sample (508) from binding to the hemoglobin nanowires (504). This Joule heating is shown by the black color of nanowires (504).

By contrast, the first group of total mRNA nanowires (502) is not subjected to Joule heating, and these total mRNA biosensing nanowires are kept at the ambient temperature of fluid (506), which typically will be in the 2 to 25 or 2 to 30° C. range. These ambient temperatures (non-heated) of these non-heated nanowires are shown by the white color of nanowires (502). As previously discussed, often multiple copies of such nanowires will be used.

As the crude sample flows through the capillary device, it passes over the first set of total mRNA biosensing nanowires (512). Because the first set of total mRNA nanowires (502) is not heated at this point in the cycle, the poly A sequence common to all mRNA analyte molecules binds to the poly T detection group nucleic acid molecules, which in turn are bound to the nanowire (514). The remaining "junk" molecules from the crude mix of cytoplasmic molecules pass over the second group of hemoglobin mRNA biosensing nanowires (516), but because these second nanowires are subjected to Joule heating at this point in the assay, no molecules from this crude "junk" mix bind to this second group of heated nanowires (504).

The rest of this assay is continued in FIG. 7.

In FIG. 7, the Joule heating is now removed from the second group of hemoglobin mRNA sensing nanowires (604), which allows these hemoglobin nanowires to return to the ambient temperature of the fluid (506). Joule heating is instead applied to the first group of total mRNA binding and biosensing nanowires (602). This heat causes the purified total mRNA analyte molecules, which had previously bound to the poly T detection group nucleic acid molecules on nanowires (502), to dissociate (606). These dissociated and partially purified total mRNA analyte molecules are carried downstream by the fluid (506). The hemoglobin mRNA portion of the now detached and partially purified total mRNA molecules then bind to the second group of hemoglobin mRNA sensing nanowire biosensors (614). The amount of hemoglobin mRNA analyte molecules can be assessed by running a low (analytical) level of electrical current through these hemoglobin nanowires. After the concentration of bound hemoglobin mRNA analyte (614) is assessed, these nanowires may then be regenerated for subsequent use by another cycle of Joule heating.

Thus, in this example, the ratio in the final signal between the analyte bound to hemoglobin mRNA nanowires (504) (614) and the analyte bound total mRNA nanowires (502) (514) will give the hemoglobin mRNA to total mRNA ratio. Further, since the hemoglobin mRNA signal (614) may be relatively small, this hemoglobin signal is less likely to be thrown off by nonspecific binding from cytoplasmic junk molecules (516) because the hemoglobin nanowires (504) were subjected to Joule heating during the time that the "junk" molecules (516) were passing over hemoglobin nanowires (504). The end result is more accurate and complete information.

This process of different cycles of Joule heating and cooling can be extended to create still more elaborate analytical devices. As an example, intermediate levels of Joule heating can be used on a selective (intermediate temperature) basis to elute or remove less tightly bound analytes from biosensing nanowires, while retaining the more tightly bound analytes.

Thus, for example, a nucleic acid detector element bound to a nanowire may bind target analyte DNA or RNA molecules that are highly (such as 100%) complementary (higher sequence homology) to the detector element nucleic acid sequence, or which are only partially (such as less than 100%) complementary (lower sequence homology) to the detector element sequence. At lower nanowire temperatures, all of the target nucleic acid analytes will bind. However if the temperature of the nanowire is then raised to an intermediate level of temperature, such as 50° C., those target analyte sequences that are more weakly bound because they were not so highly complementary to the detector sequence will dissociate from the nanowire, leaving the more highly complementary (higher sequence homology) analyte sequences remaining.

Thus an estimate of the fraction of the analyte population that is highly complementary to the detection element sequence, versus the fraction of the analyte population that is less highly complementary to the detection element sequence, can be assessed by such partial (intermediate) Joule heating steps. After each intermediate Joule heating step, the amount of analyte nucleic acid remaining bound to the nanowire can be assessed by running an analytical level of current through the nanowire. These concepts can be extended to determine a wide range of intermediate homology matching between analyte nucleic acids and detector (probe) nucleic acids.

Figure 8:
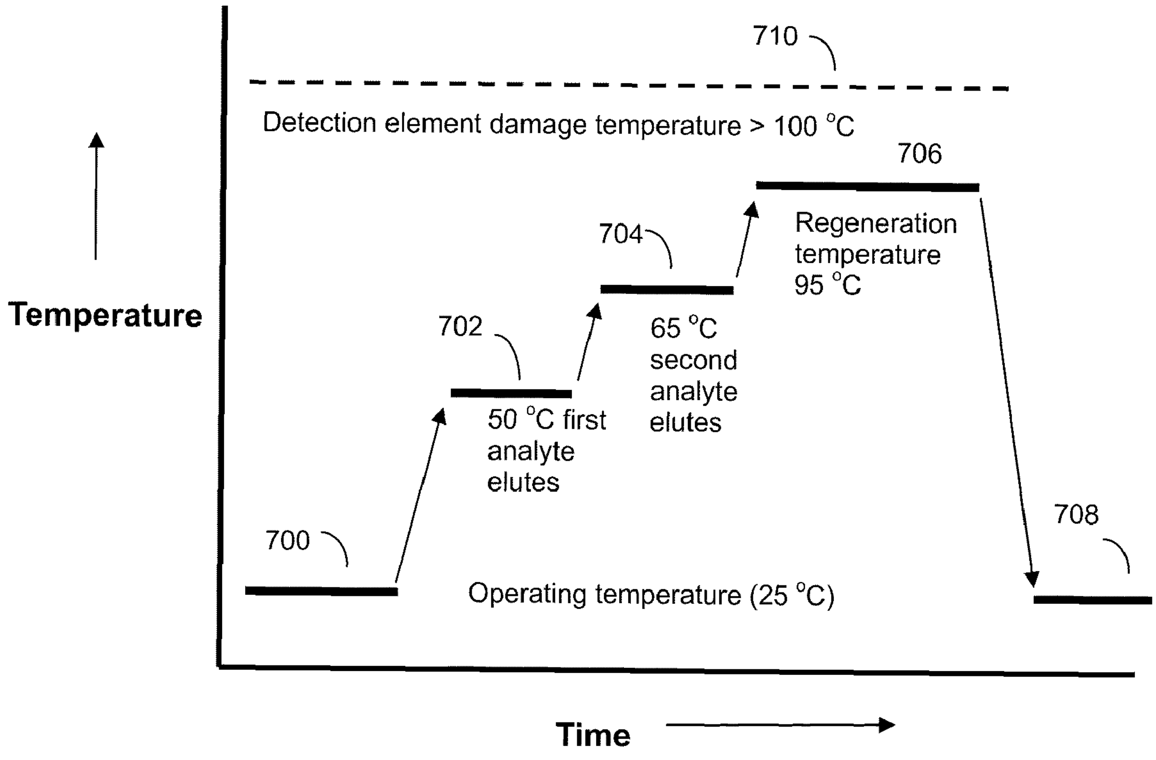
FIG. 8 shows how variations in nanowire Joule heating can alter the specificity of a biosensing nanowire to multiple analytes, as well as allow for regeneration.

FIG. 8 shows an example of the heating cycle that can be used in such a partial homology analysis. In this example, the biosensing nanowire uses a nucleic acid detection element that is capable of binding to both a first and a second analyte nucleic acid in the sample, and the second analyte binds to the detection element with higher affinity, due to a closer sequence match (higher homology) with the detection element. In step (700), the biosensing nanowire is cool, and both analytes bind. In step (702), the biosensing nanowire is subjected to enough Joule heating to raise the temperature of the nanowire to approximately 50° C. At this temperature, the bond between the lower affinity first analyte and the detection element breaks, and the first analyte dissociates from the nanowire, but the second, more tightly bound analyte, remains attached to the nanowire.

At this point, two things may be done. The nanowire running at temperature (702) may then be cooled off again to the operating temperature (700), (708) by removing the Joule heating current, and the amount of remaining bound analyte directly assessed by running an analytical amount of current through the nanowire. Alternatively, using a configuration similar to that shown in FIGS. 6 and 7, a second downstream nanowire with a detection element sequence complementary to the first analyte sequence may capture the eluted first analyte, and measure it.

After step (702), the second analyte that remains bound to the biosensing nanowire surface may be eluted by raising the nanowire to a higher temperature (706), such as 65° C., by a higher level of Joule heating. After this is done, the nanowire may once again be brought back down to a non-heated temperature (700), (708), and the difference between the amount of analyte bound before step (704) and the amount of analyte bound after step (704) assessed. Alternatively, another downstream biosensor nanowire optimized to detect the second analyte may be used to detect the second analyte released in step (704).

After all the detection steps are done, the biosensor may once again be fully regenerated by bringing it up to a higher regeneration temperature (706), such as 95° C., which will normally be expected to elute all bound analyte, yet still be below the temperature (710) where the nanowire bound detection elements will be damaged or detached from the nanowire.

Figure 9:
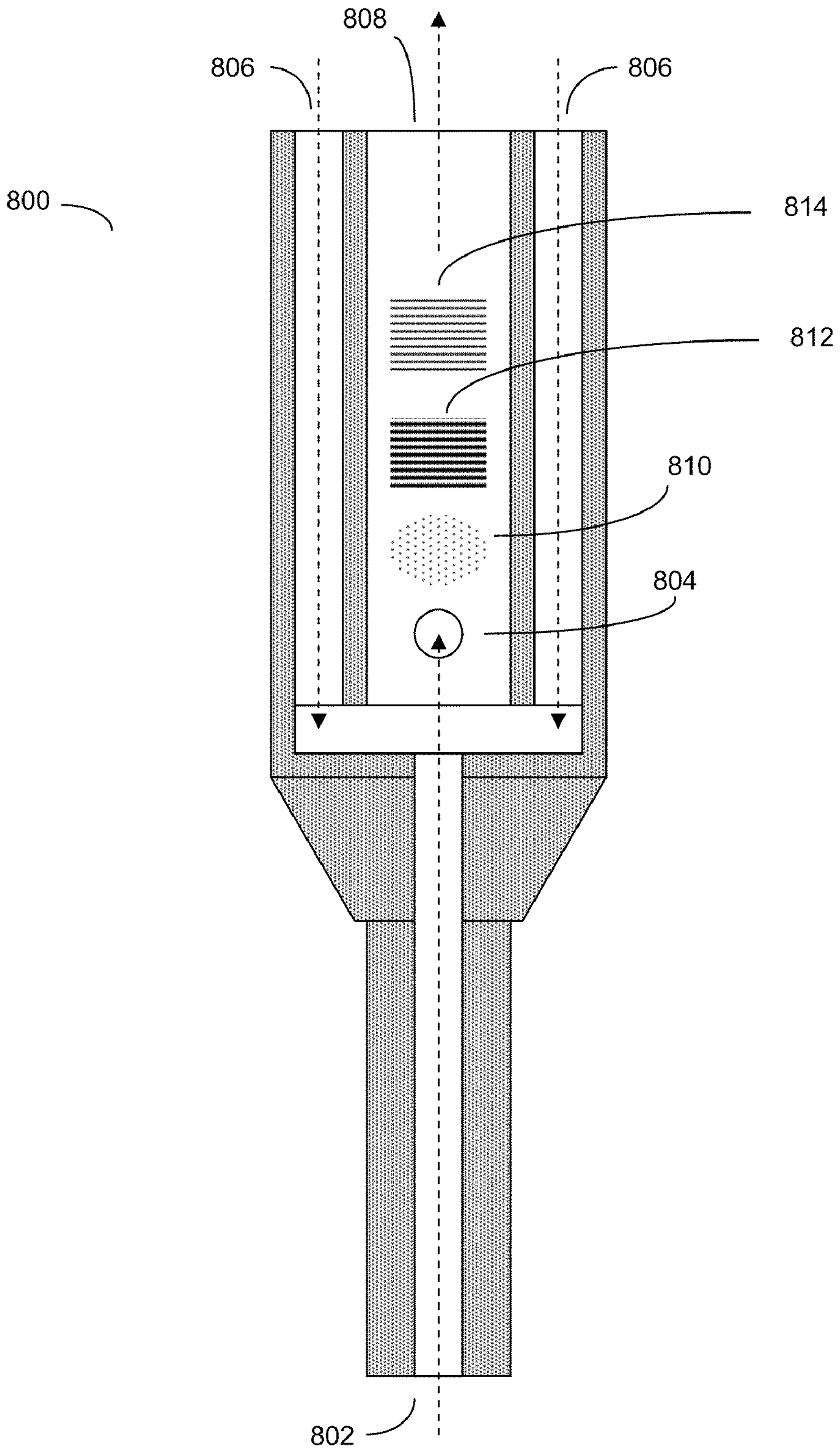
FIG. 9 shows the Joule heating regenerable nanowire biosensor packaged into a needle biopsy diagnostic device.

In addition to being used in flow cell analytical devices for laboratory use, the reusable biosensing nanowires may also be packaged into alternative configurations and used for medical or industrial applications. An example of one such alternative device is shown in FIG. 9.

In this device, the biosensing nanowires are again used in a flow cell configuration, but the flow cell configuration itself is configured into a robust "needle like" analytical device (800) designed to directly obtain and analyze various types of medical or industrial samples. Here samples obtained by suction from the hollow needle portion of the device (802) are injected into an inlet port of a flow cell (804) contained inside the device. The flow cell is supplied by additional channels (806) that supply a sheath fluid buffer for carrying the needle sample.

The far end of the flow cell (808) is connected to a peristaltic pump or other device that withdraws fluid in a gentle and controlled manner. Thus fluid is continually injected into flow cell by buffer streaming in from channels (806) and needle inlet port (802) and is withdrawn at the other side (808). A sample analyte that has been sucked in from needle opening (802) is shown as (810). This corresponds to the analyte sample (508) previously shown in FIG. 6. Ports (806) and (808) may be connected to fluid reservoirs and support apparatus via a flexible tubing (not shown), and the inputs and outputs to the nanowire sensors (812), (814) connected to sources of electrical current and current analyzing devices on a support apparatus via wires, allowing device (800) to be conveniently manipulated by hand, much like a pen, handheld pointer, or hand-held surgical biopsy probe.

In this example, the flow cell has two types of biosensing nanowires. The first set (812) corresponds to the "sample purification" biosensing nanowires (502) previously discussed in FIGS. 6 and 7. The second set (814) corresponds to the second set (504) of biosensing nanowires.

The operation of this device will generally be along the lines previously discussed in FIGS. 6 and 7. Here, the main difference is that the flow cell has been packaged into a more robust package intended for routine medical or industrial applications.

Some of the medical and industrial applications for this type of device include infectious disease detection of viral or microbial genomes, as well as real-time patient biopsy analysis of diseased tissues. As an example, the probe could be used as part of a cancer biopsy system, in which samples from a tissue suspected of being malignant were sucked up via port (802) and analyzed for cancer genetic markers.

Many industrial, law enforcement, and forensic applications exist as well. As an example, the authenticity of foods can be checked by monitoring for the presence or absence of the genetic markers specific for that type of food. Samples from a crime scene can be analyzed for useful genetic markers to identify suspects or victims.

The reversible biosensing nanowires may be incorporated into other analytical device formats as well, such as two dimensional microarray formats. Such microarrays are typically composed of a large number of individual detection elements, typically 10, 100, 1000, 10,000, and even 100,000 detection elements, usually arranged in a relatively small area (such as an area on the order of 0.1 $cm^2$ to 20 $cm^2$, and often around 1-2 $cm^2$ on a flat surface such as a non-bibulous glass, plastic, or silicon substrate, or a bibulous surface such as a nylon membrane. Here the electrodes leading to the nanowires may be arranged in an x, y, grid pattern, with individual nanowires, each of which can potentially have a different set of attached detection elements, disposed so as to enable a small sample to be analyzed by a large number of different biosensors at the same time.

Unlike conventional microarrays, however, the ability to regenerate the individual microarray sensing elements by controlled Joule heating, either after or during an assay, can convey some unique benefits. If the Joule heating is applied to all the nanowire biosensors, the microarray may be regenerated and used multiple times. Alternatively the Joule heating can be used to change the specificity of at least some of the microarray nanowire sensors, or change the sensitivity of at least some of the microarray nanowire sensors.

As one example, the microarray may be composed of various single nucleotide polymorphism (SNP) nucleic acids taken from a genetic population of interest, such as an average human SNP population, and used for medical or forensic purposes. Using Joule heating techniques, this single microarray can either be reused, or alternatively have the sensitivity of various SNP detecting elements dynamically altered based upon prior knowledge of the status of the sample. For example, if the analyte is known to be degraded, then Joule heating may be applied to certain detection elements to make these specific elements either more sensitive or less sensitive, as desired. If a certain specimen is suspected to have a high number of genetic repeats, resulting in some nucleic acid SNP's being over represented in the sample, the sensitivity of the sensing elements that detect these SNP's can be either raised or lowered so as to either quantitate the amount of genetic repeat more precisely, or alternatively correct for the distorting effect of the genetic repeats.

The invention claimed is:

1. A nanowire sensor device for analyte detection, said device comprising:

at least one nanowire sensor, said biosensor having attached detection elements capable of binding to analyte molecules of at least one analyte of interest;

a detection device that detects a detectable signal induced in the nanowire sensor as a result of the analyte molecules binding to the attached detection elements;

a Joule heating device to administer a controlled amount of Joule heating electrical current to the nanowire sensor, said controlled amount of Joule heating electrical current being sufficient to cause said analyte molecules to dissociate from said attached detection elements, but in which said controlled amount of Joule heating electrical current is insufficient to cause said attached detection elements to dissociate from said nanowire sensor.

2. The device of claim 1, in which the nanowire sensor is a biosensor, and the detection elements are molecules that bind to biological analyte molecules or organic analyte molecules.

3. The method of claim 1, in which the nanowire sensor is placed in a flowing fluid stream, and the analyte molecules are carried in said flowing fluid stream.

4. The device of claim 1, further comprising a flow cell, in which said nanowire sensor is mounted in said flow cell, and in which said analyte molecules are carried to said nanowire sensor by an aqueous fluid or buffer.

5. The device of claim 1, in which said detection elements are molecules selected from a group consisting of proteins, nucleic acids, nucleic acid binding molecules, protein binding molecules, deoxyribonucleic acid (DNA), ribonucleic acid (RNA), peptide nucleic acid (PNA), carbohydrates, lipids, and saccharides.

6. The device of claim 1, in which said detection elements are molecules that are bound to a surface of said nanowire sensor by at least one covalent bond or are are bound to the surface of said nanowire sensor by a bond that survives exposure to 100° C. temperature.

7. The device of claim 1, in which said analyte molecules are bound to said detection elements only by one or more non-covalent bonds or by a bond that does not survive exposure to 100° C. temperature.

8. The device of claim 1, in which the detection device does not heat the nanowire sensor to a temperature more than 10° C. above an ambient device temperature.

9. The device of claim 1, in which said controlled amount of Joule heating amount of electrical current is set at a voltage, current, and time parameters which provide at least 10° C. of Joule heating of the nanowire sensor, but less than 100° C. Joule heating of the nanowire sensor.

10. The method of claim 1, in which the analyte molecules are dissociated from the nanowire sensor by progressively increasing the controlled amount of Joule heating amount of electrical current until the analyte molecules dissociate from the attached detection elements.

11. The method of claim 10, in which the Joule heating amount of electrical current is administered as a series of pulses, and in which the dissociation of the analyte molecules from the attached detection elements is monitored by an analytical amount of electrical current in-between the series of pulses, —or in which a resistance of the nanowire is determined while the controlled amount of Joule heating electrical current is being applied, and a level of the controlled amount of Joule heating electrical current is then dynamically varied depending upon this resistance measurement.

12. The device of claim 1, in which the controlled amount of Joule heating electrical current is set by a process of monitoring the temperature of the nanowire sensor, and adjusting the controlled amount of Joule heating electrical current flowing through the nanowire sensor to achieve the nanowire sensor temperature that causes said analyte molecules to dissociate from said attached detection elements, but in which said controlled amount of Joule heating electrical current is insufficient to cause said attached detection elements to dissociate from said nanowire sensor.

13. The device of claim 12, in which the temperature of the nanowire sensor is monitored by temperature sensing elements located on a substrate that supports the nanowire sensor, by infrared emission from the nanowire sensor, or by monitoring optical characteristics of temperature sensitive dyes located on or near the nanowire sensor.

14. The device of claim 1, in which the detection device has at least two groups of nanowire biosensors, in which a first group of nanowire biosensors binds the analyte molecules, and in which the controlled amount of Joule heating electrical current is applied to the first group of nanowire biosensors and causes the first group of nanowire biosensors to release the analyte molecules, and in which at least some of the analyte molecules released by the first group of nanowire biosensors is subsequently captured and detected by the second group of nanowire biosensors.

15. The device of claim 1, in which the detection device has at least two groups of nanowire biosensors, in which a first group of nanowire biosensors binds the analyte molecules, and in which a second controlled amount of Joule heating electrical current is first applied to the second group of nanowire biosensors to prevent analyte from binding to the second group of nanowire biosensors;

removing the second controlled amount of Joule heating electrical current from the second group of nanowire biosensors and applying the first controlled amount of Joule heating electrical current to the first group of nanowire biosensors, thereby dissociating bound analyte from the first group of nanowire biosensors;

and using the second group of nanowire biosensors to detect bound analyte that has been released from the first group of nanowire biosensors.

16. The device of claim 1, used as a sensor device for a flow lysometer.

17. The device of claim 1, in which a plurality of the nanowire sensors are arranged in a two dimensional microarray, and in which the controlled amount of Joule heating electrical current is applied to at least some of the nanowire sensors and used to either regenerate the microarray, change the specificity of at least some of the microarray nanowire sensors, or change the sensitivity of at least some of the microarray nanowire sensors.

18. A method of regenerating a nanowire sensor, said nanowire sensor containing attached detection elements, said nanowire sensor being capable of detecting a presence of complementary analyte molecules that bind to said attached detection elements by sensing alterations in a flow of an analytical amount of electrical current passing through said nanowire sensor, said method comprising:

passing a Joule heating amount of electrical current through said nanowire sensor in a sufficient time and amount to cause said nanowire sensor to heat, thereby causing said complementary analyte molecules to dissociate from said attached detection elements, but in which said Joule heating amount of electrical current is insufficient to cause said attached detection elements to dissociate from said nanowire sensor;

stopping or reducing said Joule heating amount of electrical current, thereby allowing said nanowire sensor to cool, thereby producing a regenerated nanowire sensor in which said attached detection elements are not presently bound to said complementary analyte molecules.

19. The method of claim 18, in which the nanowire sensor is placed in a flowing fluid stream, and said complementary analyte molecules are carried in said flowing fluid stream.

20. The method of claim 18, in which said detection elements are molecules selected from a group consisting of proteins, nucleic acids, nucleic acid binding molecules, protein binding molecules, deoxyribonucleic acid (DNA), ribonucleic acid (RNA), peptide nucleic acid (PNA), carbohydrates, lipids, and saccharides.

21. The method of claim 18, in which said detection elements are molecules that are bound to a surface of said nanowire sensor by at least one covalent bond or by a bond that survives exposure to 100° C. temperature.

22. The method of claim 18, in which said complementary analyte molecules are bound to said detection elements only by one or more non-covalent bonds or by a bond that does not survive exposure to 100° C. temperature.

23. The method of claim 18, in which the analytical amount of electrical current is set at a set of voltage, current, and time parameters which keep the joule heating of the nanowire sensor under 1° C.

24. The method of claim 18, in which the analytical amount of electrical current is set at the voltage, current, and time parameters which keep the joule heating of the nanowire sensor under 10° C.

25. The method of claim 18, in which the Joule heating amount of electrical current is set at the voltage, current, and time parameters which provide at least 10° C. of joule heating of the nanowire sensor, but less than 100° C. joule heating of the nanowire sensor.

26. The method of claim 18, in which said complementary analyte molecules are dissociated from the nanowire by progressively increasing the Joule heating amount of electrical current until said complementary analyte molecules dissociate from said attached detection elements.

27. The method of claim 26, in which the Joule heating amount of electrical current is administered as a series of pulses, and in which the dissociation of said complementary analyte molecules from the attached detection elements is monitored by an analytical amount of electrical current in-between the series of pulses, or in which a resistance of the nanowire is determined while the Joule heating amount of electrical current is being applied, and a level of the Joule heating amount of electrical current is then dynamically varied depending upon this resistance measurement.

28. The method of claim 18, in which the Joule heating amount of electrical current is set by a process of monitoring a temperature of the nanowire sensor, and adjusting the amount of electrical current flowing through the nanowire sensor to achieve the nanowire sensor temperature that causes said complementary analyte molecules to dissociate from said attached detection elements, but in which said Joule heating amount of electrical current is insufficient to cause said attached detection elements to dissociate from said nanowire sensor.

29. The method of claim 28, in which the temperature of the nanowire sensor is monitored by temperature sensing elements located on a substrate that supports the nanowire sensor, by infrared emission from the nanowire sensor, or by monitoring optical characteristics of temperature sensitive dyes located on or near the nanowire sensor.

30. The method of claim 18, in which there are at least two groups of nanowire biosensors, in which a first group of nanowire biosensors binds said complementary analyte molecules, and in which Joule heating applied to the first group of nanowire biosensors causes the first group of nanowire biosensors to release said complementary analyte molecules, and in which at least some of said complementary analyte molecules released by the first group of nanowire biosensors is subsequently captured and detected by the second group of nanowire biosensors.

31. The method of claim 18, in which there are at least two groups of nanowire biosensors, in which a first group of nanowire biosensors binds said complementary analyte molecules, and in which the Joule heating amount of electrical current is applied to the second group of nanowire biosensors to prevent said complementary analyte molecules from binding to the second group of nanowire biosensors;

then removing the Joule heating amount of electrical current from the second group of nanowire biosensors and applying the Joule heating amount of electrical current to the first group of nanowire biosensors, thereby dissociating bound analyte from the first group of nanowire biosensors;

and using the second group of nanowire biosensors to detect analyte that has been released from the first group of nanowire biosensors.

32. The method of claim 18, in which a plurality of the nanowire sensors are arranged in a two dimensional microarray, and in which the Joule heating amount of electrical current is applied to at least some of the nanowire sensors and used to either regenerate the two dimensional microarray, change a specificity of at least some of the microarray nanowire sensors, or change a sensitivity of at least some of the microarray nanowire sensors.

33. A method of improving a specificity of a nanowire sensor, said nanowire sensor containing attached detection elements, said nanowire sensor being capable of detecting a presence of complementary analyte molecules that bind to said detection elements with higher or lower binding force by sensing alterations in a flow of an analytical amount of electrical current passing through the nanowire sensor, and in which the complementary analyte molecules consist of at least a first group of higher binding force analyte molecules and a second group of lower binding force analyte molecules, said method comprising:

passing a Joule heating amount of electrical current through the nanowire sensor at a sufficient time and amount to cause the nanowire sensor to heat, thereby causing the second group of lower binding force analyte molecules to either not attach to the detection elements, or dissociate from the detection elements, but in which said Joule heating is insufficient to cause the first group of higher binding force analyte molecules to fail to attach to the detection elements and is also insufficient to cause the first group of higher binding force analyte molecules dissociate from the detection elements, and in which the Joule heating is also insufficient to damage the attached detection elements or cause the attached detection elements to dissociate from the nanowire sensor.

34. The method of claim 33, in which the nanowire sensor is placed in a flowing fluid stream, and the complementary analyte molecules are carried in said flowing fluid stream.

35. The method of claim 33, in which said detection elements are molecules selected from a group consisting of proteins, nucleic acids, nucleic acid binding molecules, protein binding molecules, deoxyribonucleic acid (DNA), ribonucleic acid (RNA), peptide nucleic acid (PNA), carbohydrates, lipids, and saccharides.

36. The method of claim 33, in which said detection elements are molecules that are bound to a surface of said nanowire sensor by at least one covalent bond or are bound to the surface of said nanowire sensor by a bond that survives exposure to 100° C. temperature.

37. The method of claim 33, in which said complementary analyte molecules are bound to said detection elements only by one or more non-covalent bonds or by a bond that does not survive exposure to 100° C. temperature.

38. The method of claim 33, in which the analytical amount of electrical current is set at a set of voltage, current, and time parameters which keep the Joule heating of the nanowire sensor under 1° C.

39. The method of claim 33, in which the analytical amount of electrical current is set at the voltage, current, and time parameters which keep the Joule heating of the nanowire sensor under 10° C.

40. The method of claim 33, in which the Joule heating amount of electrical current is set at the voltage, current, and time parameters which provide at least 10° C. of joule heating of the nanowire sensor, but less than 100° C. joule heating of the nanowire sensor.

41. The method of claim 33, in which said complementary analyte molecules are dissociated from the nanowire by progressively increasing the Joule heating amount of electrical current until said complementary analyte molecules dissociate from the attached detection elements.

42. The method of claim 41, in which the Joule heating amount of electrical current is administered as a series of pulses, and in which the dissociation of said complementary analyte molecules from the attached detection elements is monitored by an analytical amount of electrical current in-between the series of pulses, or in which a resistance of the nanowire is determined while the Joule heating current is being applied, and a level of the Joule heating current is then dynamically varied depending upon this resistance measurement.

43. The method of claim 33, in which the Joule heating amount of electrical current is set by a process of monitoring the temperature of the nanowire sensor, and adjusting the amount of electrical current flowing through the nanowire sensor to achieve the nanowire sensor temperature that causes the second group of lower binding force analyte molecules to dissociate from said attached detection elements, but in which said Joule heating is insufficient to cause the first group of higher binding force analyte molecules to dissociate from the attached detection elements.

44. The method of claim 43, in which the temperature of the nanowire sensor is monitored by temperature sensing elements located on a substrate that supports the nanowire sensor, by infrared emission from the nanowire sensor, or by monitoring optical characteristics of temperature sensitive dyes located on or near the nanowire sensor.

45. The method of claim 33, in which there are at least two sets of nanowire biosensors, in which a first set of nanowire biosensors binds both the first group of higher binding force analyte molecules and second group of lower binding force analyte molecules, and in which the Joule heating amount of electrical current applied to the first set of nanowire biosensors causes the first set of nanowire biosensors to release the second group of lower binding force analyte molecules but retain the first group of higher binding force analyte molecules, and in which at least some of the second group of lower binding force analyte molecules released by the first set of nanowire biosensors is subsequently captured and detected by the second set of nanowire biosensors.

46. The method of claim 33, in which there are at least two sets of nanowire biosensors, in which a first set of nanowire biosensors binds said complementary analyte molecules, and in which the Joule heating amount of electrical current is first applied to the second set of nanowire biosensors to prevent said complementary analyte molecules from binding to the second set of nanowire biosensors;

removing the Joule heating amount of electrical current from the second set of nanowire biosensors and applying the Joule heating amount of electrical current to the first set of nanowire biosensors, thereby dissociating bound analyte from the first set of nanowire biosensors;

and using the second set of nanowire biosensors to detect the bound analyte that has been released from the first set of nanowire biosensors;

in which a specificity of either the first set of nanowire biosensors, the second set of nanowire biosensors, or both sets of nanowire biosensors, to distinguish between the first group of higher binding force analyte molecules and the second group of lower binding force analyte molecules is enhanced by heating either the first set or second set of nanowires to a temperature at which the second group of lower binding force analyte molecules is either prevented from binding to at least one set of nanowire biosensors, or dissociated from at least one set of nanowire biosensors.

47. The method of claim 33, in which a plurality of the nanowire sensors are arranged in a two dimensional microarray, and in which the Joule heating amount of electrical current is applied to at least some of the nanowire sensors and used to either regenerate the microarray, change the specificity of at least some of the microarray nanowire sensors, or change the sensitivity of at least some of the microarray nanowire sensors.

* * * * *